US011263396B2

(12) United States Patent
Melehy et al.

(10) Patent No.: US 11,263,396 B2
(45) Date of Patent: Mar. 1, 2022

(54) SYSTEM AND METHOD FOR DOCUMENT CONVERSION TO A TEMPLATE

(71) Applicant: Woodpecker Technologies, LLC, Chicago, IL (US)

(72) Inventors: Alexander Melehy, Chicago, IL (US); George Karmelich, Rancho Palos Verdes, CA (US)

(*) Notice: Subject to any disclaimer, the term of this patent is extended or adjusted under 35 U.S.C. 154(b) by 0 days.

(21) Appl. No.: 16/739,047

(22) Filed: Jan. 9, 2020

(65) Prior Publication Data

US 2020/0218855 A1 Jul. 9, 2020

Related U.S. Application Data

(60) Provisional application No. 62/790,444, filed on Jan. 9, 2019.

(51) Int. Cl.
*G06F 17/00* (2019.01)
*G06F 40/186* (2020.01)
*G06K 9/72* (2006.01)
*G06F 40/117* (2020.01)
*G06F 40/205* (2020.01)

(52) U.S. Cl.
CPC .......... *G06F 40/186* (2020.01); *G06F 40/117* (2020.01); *G06F 40/205* (2020.01); *G06K 9/72* (2013.01)

(58) Field of Classification Search
CPC .... G06F 40/186; G06F 40/205; G06F 40/117; G06K 9/72
See application file for complete search history.

(56) References Cited

U.S. PATENT DOCUMENTS

| 5,583,762 | A | * | 12/1996 | Shafer | G06F 40/117 715/239 |
| 6,182,029 | B1 | * | 1/2001 | Friedman | G06F 40/205 704/9 |
| 9,824,128 | B1 | * | 11/2017 | Maluf | G06F 16/256 |
| 10,354,009 | B2 | * | 7/2019 | Liang | G06F 40/30 |
| 2006/0242180 | A1 | * | 10/2006 | Graf | G06F 16/86 |
| 2010/0254604 | A1 | * | 10/2010 | Prabhakara | G06K 9/00469 382/173 |
| 2012/0311426 | A1 | * | 12/2012 | Desai | G06F 40/205 715/227 |
| 2014/0297264 | A1 | * | 10/2014 | Etzioni | G06F 40/205 704/9 |
| 2015/0081277 | A1 | * | 3/2015 | Behi | G06F 40/205 704/9 |

(Continued)

*Primary Examiner* — Laurie A Ries
(74) *Attorney, Agent, or Firm* — Matthew Yospin

(57) ABSTRACT

Systems and methods are provided for converting a document comprising text to a template using a model, and for improving the model so used. The systems and methods presented comprise a local computing device, a remote computing device, communication modules, information on datatypes and patterns that may be converted from document text to template fields, rules regarding document context, and verification criteria. A user may use the systems and methods to convert a document comprising text into a template comprising fields derived from the document text, and optionally may use the systems and methods to improve the model based on a set or subset of documents. The present invention solves problems with the currently available systems and methods of converting document text to a template.

12 Claims, 12 Drawing Sheets

(56) References Cited

U.S. PATENT DOCUMENTS

2017/0220544 A1\* 8/2017 Masson ................. G06F 40/186
2017/0228368 A1\* 8/2017 Carter .................. G06F 40/216
2018/0253409 A1\* 9/2018 Carlson ................ G06F 40/197

\* cited by examiner

SYSTEM AND METHOD FOR DOCUMENT CONVERSION TO A TEMPLATE

FIELD OF THE INVENTION

The presently disclosed subject matter relates to providing systems and methods for creating template documents, and more particularly, to systems and methods for converting a document comprising text to a template and for improving the model used to convert a document comprising text to a template.

BACKGROUND OF THE INVENTION

In working with documents, templates are often desirable to increase the speed and accuracy of creating and customizing a document, while retaining necessary elements of the document. Users often cut and paste sections between documents, or take a previously created document and manually edit text in the document. For instance, a user creating a legal agreement may take a previously-created document, and change certain types of data in the text of the document, including but not limited to the names of the parties to the agreement, relevant dates, addresses, email addresses, and company names. This is a problematic way to create legal documents, or any document, as it requires a considerable amount of time for revisions and proof-reading. This manual revision and editing process is expensive, as people are paid for their labor, and time spent revising and editing cannot be spent on other activities. This is also an error-prone approach, as people tend to make mistakes, especially when editing documents that are mostly alike. Such documents are well-suited to being made into reusable templates.

While prior art does exist for creating templates, the available art does not provide a satisfactory system or method for taking a document containing text, which may be arbitrary meaning it may contain any text, and programmatically searching the text for defined datatypes and patterns, verifying the instances found in the document text of those datatypes and patterns, and creating a template document with those matched and verified datatypes and patterns from the document text replaced with fields in a created template document.

Additionally, the prior art does not present a satisfactory system or method for improving the model used to create a template from a document, based on a set or subset of documents, such that the model may be recursively or repeatedly customized to the preferences of a user or group of users.

SUMMARY OF THE INVENTION

The present invention meets all these needs, by disclosing systems, and methods, and instructions stored in non-transitory computer-readable media for receiving arbitrary document text, programmatically searching the text for defined datatypes and patterns, verifying the instances found in the document text of those datatypes and patterns, and creating a template document with those matched and verified datatypes and patterns from the document text replaced with fields in a created template document.

The present invention addresses the problems of the prior art, which do not present systems and methods for programmatically creating a document template from arbitrary document text. The present invention presents a system and method for improving the model used to create a template from a document, based on a set or subset of documents.

These aspects of the present invention, and others disclosed in the Detailed Description of the Drawings, represent improvements on the current art. This summary is provided to introduce a selection of concepts in a simplified form that are further described below in the Detailed Description of the Drawings. This Summary is not intended to identify key features or essential features of the claimed subject matter, nor is it intended to be used to limit the scope of the claimed subject matter. The terms "approximate" or "approximately" and similar conjugates mean, for purposes of this disclosure, values within 10% of each other. The singular and plural are interchangeable and a term in the singular includes the plural, or vice-versa, unless such reading is contradicted by the context.

BRIEF DESCRIPTION OF THE DRAWINGS

The foregoing summary, as well as the following detailed description of various aspects, is better understood when read in conjunction with the appended drawings. For the purposes of illustration, the drawings show exemplary aspects; but the presently disclosed subject matter is not limited to the specific methods and instrumentalities disclosed. In the drawings, like reference characters generally refer to the same components, or steps of the methods, throughout the different figures. In the following detailed description, various aspects of the present invention are described with reference to the following drawings, in which.

DETAILED DESCRIPTION OF THE DRAWINGS

The presently disclosed invention is described with specificity to meet statutory requirements. But, the description itself is not intended to limit the scope of this patent. Rather, the claimed invention might also be configured in other ways, to include different steps or elements similar to the ones described in this document, in conjunction with other present or future technologies. Moreover, although the term "step" or similar terms may be used herein to connote different aspects of methods employed, the term should not be interpreted as implying any particular order among or between various steps herein disclosed unless and except when the order of individual steps is explicitly described.

In the following description, numerous specific details are set forth to provide a thorough understanding of the invention. But, the present invention may be practiced without these specific details. Structures and techniques that would be known to one of ordinary skill in the art have not been shown in detail, in order not to obscure the invention. Referring to the figures, it is possible to see the various major elements constituting the apparatus and methods of use of the present invention.

The present invention comprises a system 100 and methods for template creation from document text.

Figure 1:
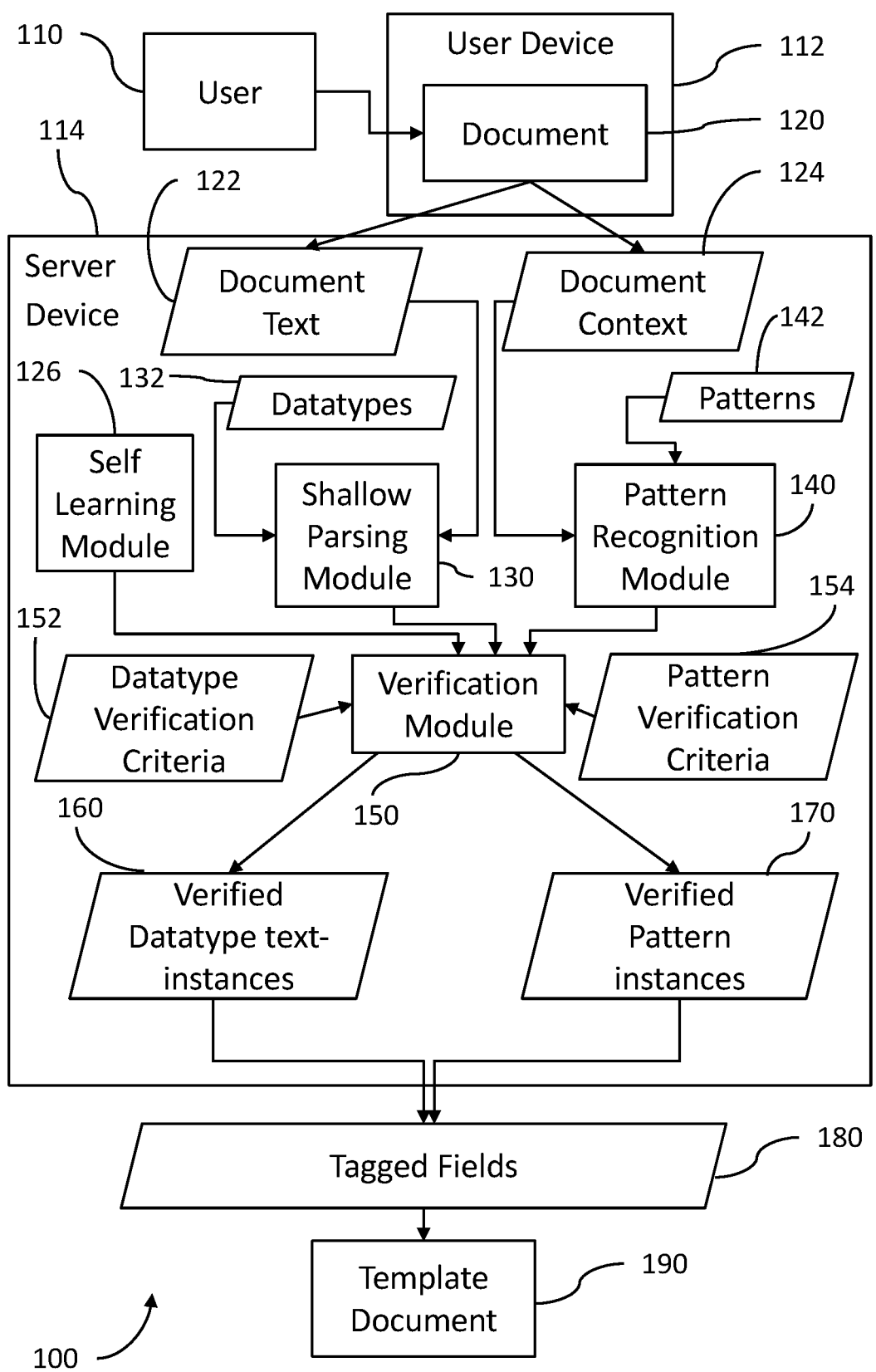
FIG. 1 is a dataflow diagram of a system for template creation from document text according to an aspect of the present invention.

With reference to FIG. 1, a dataflow diagram is shown of a system 100 for template creation from document text. The system 100 may be used by a user 110, where the user 110 uses a user device 112. The system 100 comprises: a plurality of documents 120, wherein each of the plurality of documents 120 (e.g. a first document 120a, a second document 120b, a third document 120c, for any number of documents in the plurality of documents 120, and wherein any non-specified document may be referred to herein as a document 120n, and wherein the first document 120a, the second document 120b, the third document 120c, and so on, are understood to be depicted in the plurality of documents 120 illustrated in FIG. 9) comprise document text 122; a set of document context 124 information; and a server device 114. The user device 112 sends document text 122 and document context 124 information to the server device 114. The server device 114 has stored on it information about a plurality of datatypes 132 and a plurality of patterns 142. A model 144, as used by the system 100, comprises the plurality of datatypes 132 and the plurality of patterns 142, and may comprise other information or data. The server device 114 may employ a self-learning module 126, may employ a shallow parsing module 130, may employ a pattern recognition module 140, and may employ a verification module 150, following the methods according to different aspects of the present invention, and disclosed herein. The verification module 150 applies a plurality of datatype verification criteria 152 and a plurality of pattern verification criteria 154 that are stored on the server device 114 and generates a plurality of verified datatype text-instances 160 and a plurality of verified pattern instances 170. The server device 114 sends the plurality of verified datatype text-instances 160 and the plurality of verified pattern instances 170 to the user device 112. The user device 112 then modifies the document text 122 with the addition of the plurality of verified datatype text-instances 160 and the plurality of verified pattern instances 170 to create a document text with tagged fields 180. The user device uses the document text with tagged fields 180 to create a template document 190.

Figure 2:
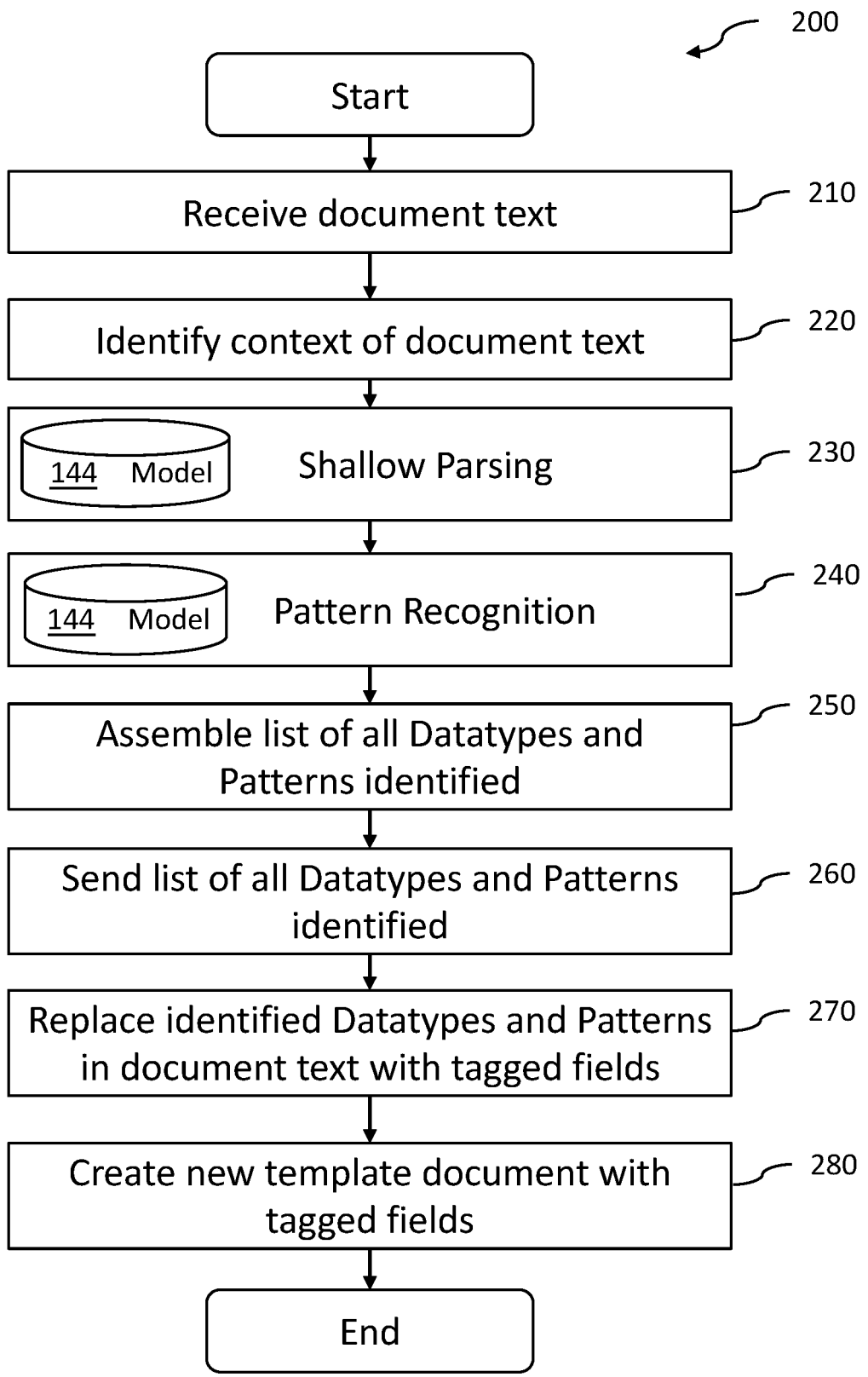
FIG. 2 is a flowchart of a method performed by the system of FIG. 1 according to an aspect of the present invention.

With reference to FIG. 2, a document conversion method 200 for template creation from document text according to one aspect of the present invention is shown. The method comprises the following steps: a server device 114 will receive 210 a document text 122, identifies 220 a context of the document text 122, conducts self-learning 226, conducts 230 shallow parsing (described in more detail below), conducts 240 pattern recognition (described in more detail below), assembles 250 a list of all datatype text-instances and pattern-instances identified in the document text 122, sends 260 the list of all datatype text-instances and pattern-instances identified from the server device 114 to the user device 112, whereupon the user device 112 replaces 270 the identified datatype text-instances and pattern-instances in the document text with a set of tagged fields 180, and creates 280 a new template document 190 with tagged fields 180.

Figure 3:
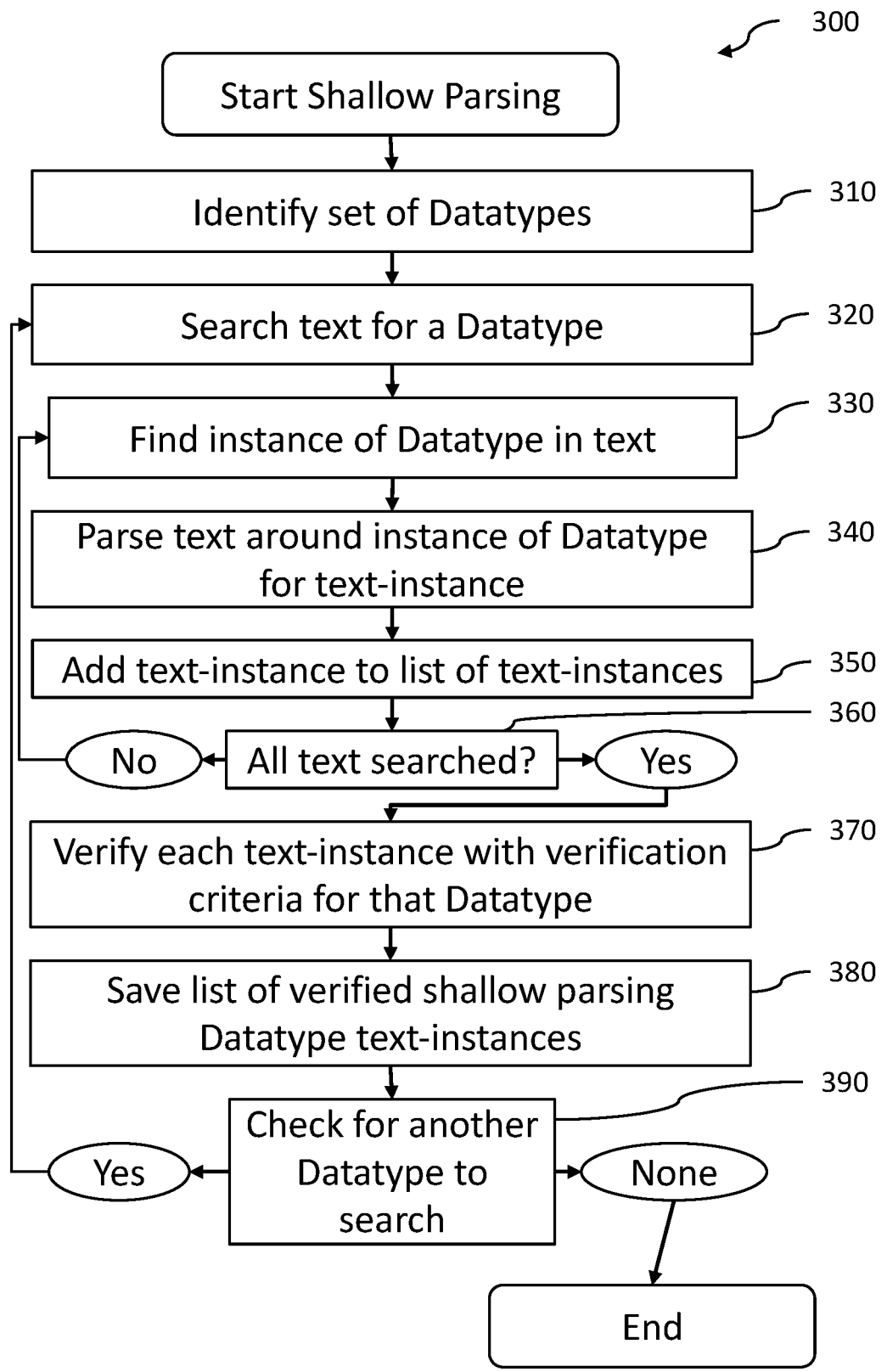
FIG. 3 is a flowchart of a selected portion of the method performed by the system of FIG. 1 according to an aspect of the present invention.

With reference to FIG. 3, a shallow parsing method 300 for template creation from document text according to one aspect of the present invention is shown. The shallow parsing method 300 is operated on one of the documents 120 of a user 110, to generate a template with fields. The system 100, following this shallow parsing method 300, identifies 310 a plurality of datatypes 132 relevant to the document text 122 and the document context 124, searches 320 the document text 122 for one of the plurality of datatypes 132, finds 330 an instance (referred to herein as a text-instance) of each one of the plurality of datatypes 132 in the document text 122, parses 340 the text around the instance of each one of the plurality of datatypes 132 for a text-instance, adds 350 the text-instance to a list of text-instances, assesses 360 whether all the document text 122 has been searched for the one of the plurality of datatypes 132, and either continues searching the document text 122 or proceeds to the next step in the shallow parsing method 300. The system 100 then verifies 370 each text-instance with datatype verification criteria 152 for that one of the plurality of datatypes 132, saves 380 each verified text-instance to a list of verified shallow parsing datatype text-instances, and checks 390 for a next one of the plurality of datatypes 132 to search. If there is another one of the plurality of datatypes 132 to search, the prior steps, described herein, of the shallow parsing method 300 will be used to search for the next one of the plurality of datatypes 132. If each applicable one of the plurality of datatypes 132 has been searched for, the shallow parsing method 300 will be stopped and the system will proceed in document conversion method 200.

Figure 4:
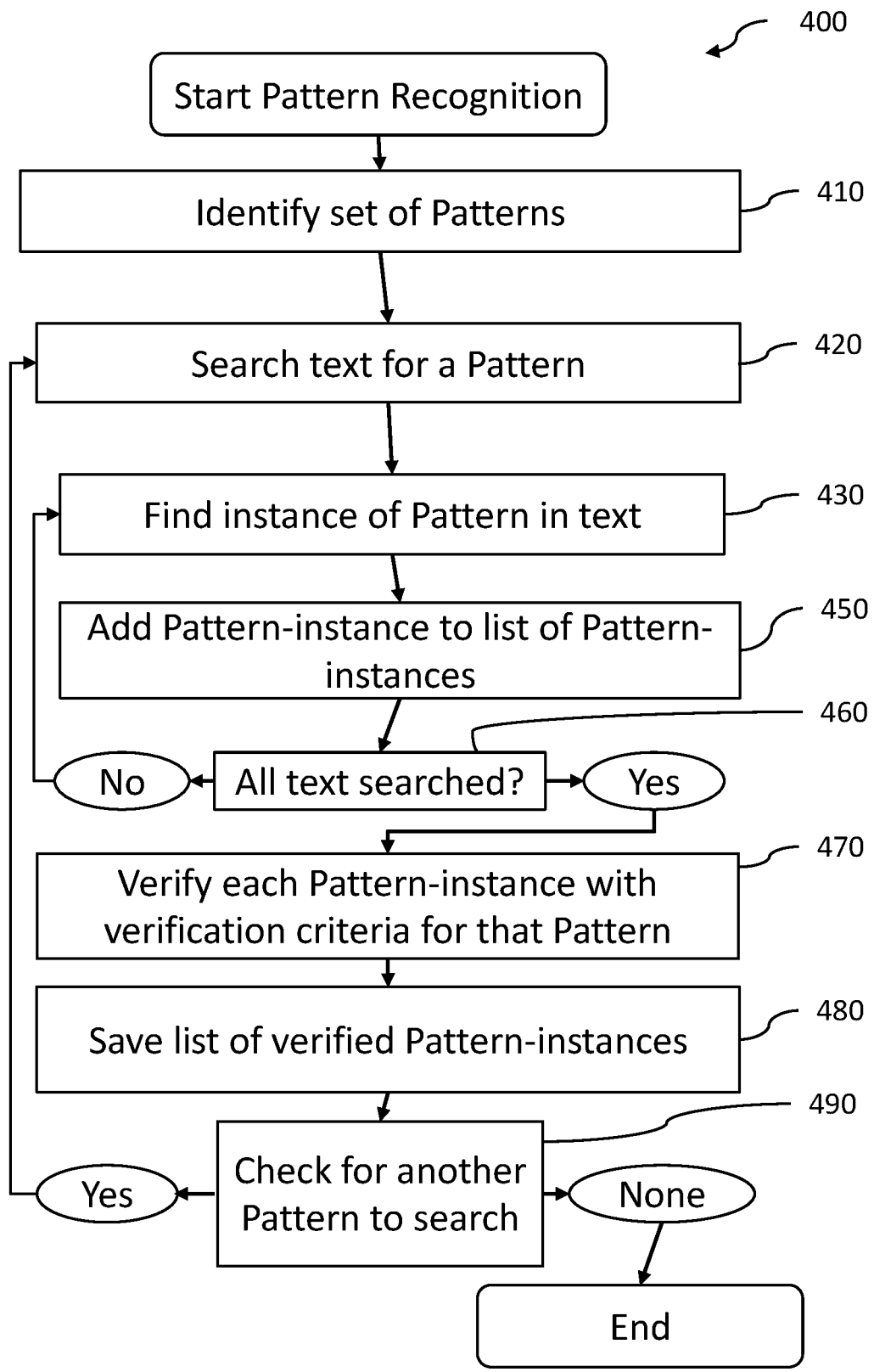
FIG. 4 is a flowchart of a selected portion of the method performed by the system of FIG. 1 according to an aspect of the present invention.

With reference to FIG. 4, a pattern recognition method 400 for Pattern Recognition according to one aspect of the present invention is shown. The system 100, following this pattern recognition method 400, identifies 410 a plurality of patterns 142 relevant to the document text 122 and the document context 124, searches 420 the document text 122 for one of the plurality of patterns 142, finds 430 a pattern-instance of that one of the plurality of patterns 142 in the document text 122, adds 450 the pattern-instance to a list of pattern-instances, assesses 460 whether all the document text 122 has been searched for that one of the plurality of patterns 142, and either continues searching the document text 122 for that one of the plurality of patterns 142 or proceeds to the next step in the pattern recognition method 400. The system 100 thereafter verifies 470 each pattern-instance with verification criteria for that one of the plurality of patterns 142, saves 480 each verified pattern-instance to a list of verified pattern-instances, and checks 490 for another one of the plurality of patterns 142 to search. If there is another one of the plurality of patterns 142 to search, the prior steps, described herein, of the pattern recognition method 400 will be used to search for a next one of the plurality of patterns 142. If each applicable one of the plurality of patterns 142 has been searched for, the pattern recognition method 400 will be stopped and the system will proceed in document conversion method 200.

With reference to FIG. 1, FIG. 2, FIG. 3, FIG. 4, FIG. 9, and FIG. 10, a document-conversion-user-device-perspective method 1000 is presented for document conversion to a template, from the perspective of a user device 112. The user device 112 stores 1010 or has stored on it a plurality of documents 120, wherein each of the plurality of documents 120 (e.g. a first document 120a, a second document 120b, a third document 120c, for any number of documents in the plurality of documents 120, and wherein any non-specified document may be referred to herein as a document 120n, and wherein the first document 120a, the second document 120b, the third document 120c, and so on, are understood to be depicted in the plurality of documents 120 illustrated in FIG. 9) comprise document text 122, and a set of document context 124 information. The user device 112 thereafter sends 1020 the document text 122 and the set of document context 124 information to the server device 114. The user device 112 thereafter receives 1030 from the server device 114 a plurality of verified datatype text-instances 160 and a plurality of verified pattern instances 170. The user device 112 thereafter modifies 1040 the document text 122 with the plurality of verified datatype text-instances 160 and the plurality of verified pattern instances 170 to create 1050 a document text with tagged fields 180. The user device thereafter uses the document text with tagged fields 180 to create 1060 a template document 190.

With reference to FIG. 1, FIG. 2, FIG. 3, FIG. 4, FIG. 9, and FIG. 11, a document-conversion-third-party-perspective method 1100 is presented for document conversion to a template, from the perspective of a third-party observer observing communications between a user device 112 and a server device 114. A user device 112 sends 1110 a document text 122 and the set of document context 124 information to a server device 114, or may send more than one document text 122 and more than one set of document context 124. The server device 114 receives 1120 the document text 122 and the set of document context 124 information. Later, the server device 114 sends 1130 to the user device 112 a plurality of verified datatype text-instances 160 and the plurality of verified pattern instances 170, and the user device 112 receives 1140 the plurality of verified datatype text-instances 160 and the plurality of verified pattern instances 170 from the server device 114.

Figure 5:
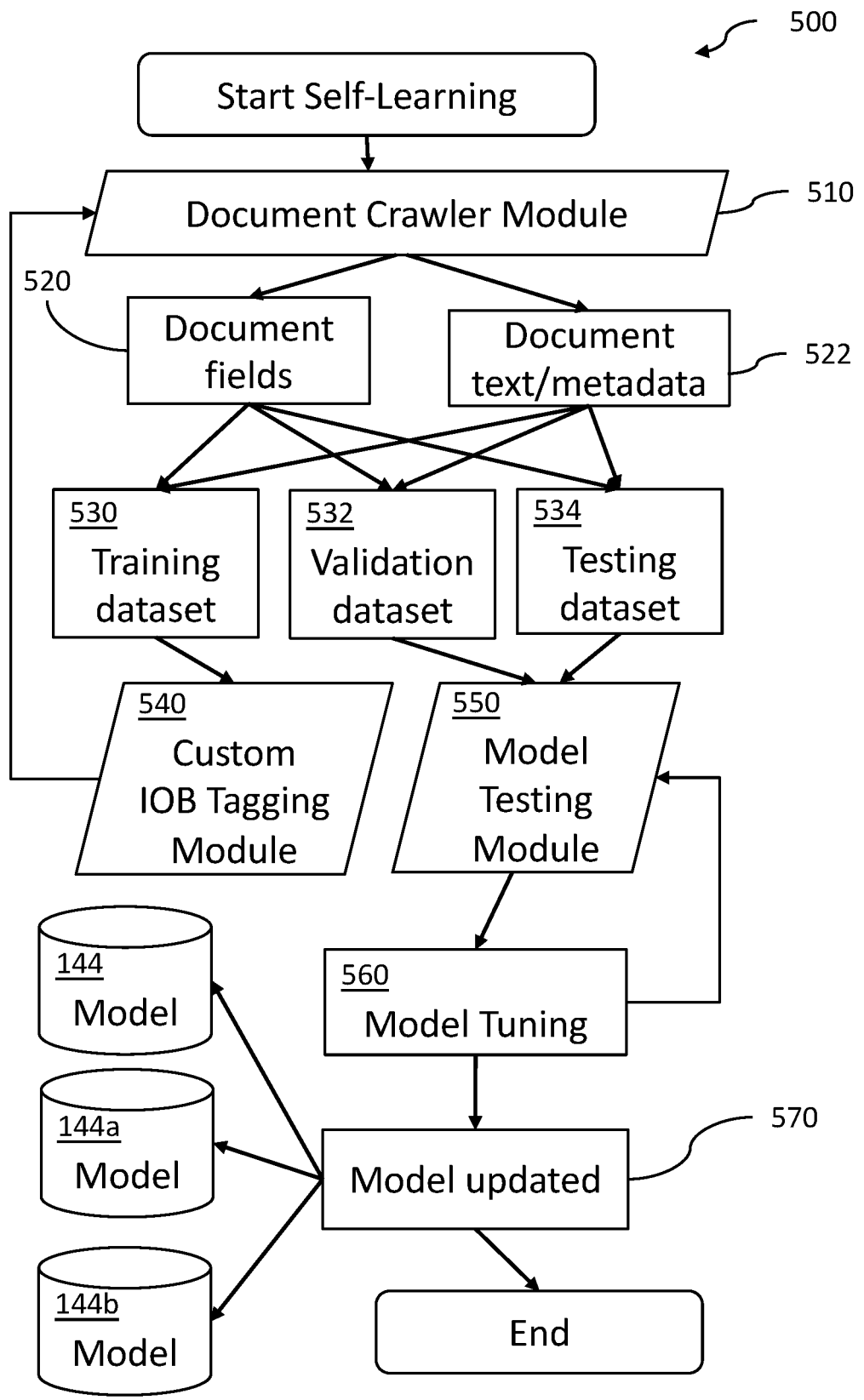
FIG. 5 is a flowchart of a selected portion of the method performed by the system of FIG. 1 according to an aspect of the present invention.

With reference to FIG. 5, a method according to one aspect of the present invention is shown, which may be referred to as the self-learning method 500. The method comprises the following steps: the self-learning module 126 initiates the document crawler module 510, described below. The document crawler module 510 generates at least one set of document fields 520 and at least one set of document text/metadata 522, based on at least one set of documents (described herein). The at least one set of document fields 520 is used to populate a training dataset 530, a validation dataset 532, and a testing dataset 534. The at least one set of document text/metadata 522 is used to populate the training dataset 530, the validation dataset 532, and the testing dataset 534. The training dataset 530 is used in the custom 10B tagging module 540, which conveys information regarding 10B tagging to the document crawler module 510.

The validation dataset 532 and the testing dataset 534 are used in the model testing module 550 for model tuning 560, which is described below in greater detail, and which process of the model testing module 550 being used for model tuning 560 may be repeated any number of times. At some or any point in time, the model tuning 560 may be stopped or paused, and the model 144 is updated with model updates 570. After the model 144 is updated with model updates 570, the model 144 may be used by the system 100 in the document conversion method 200, specifically in the shallow parsing module 130 and in the pattern recognition module 140, as described above in greater detail. The self-learning method 500 can be used to add to or refine the plurality of datatypes 132, by adding to the plurality of datatypes 132. This may be done for all users 110, or just for a subset of users 110, as described below in more detail.

Figure 6:
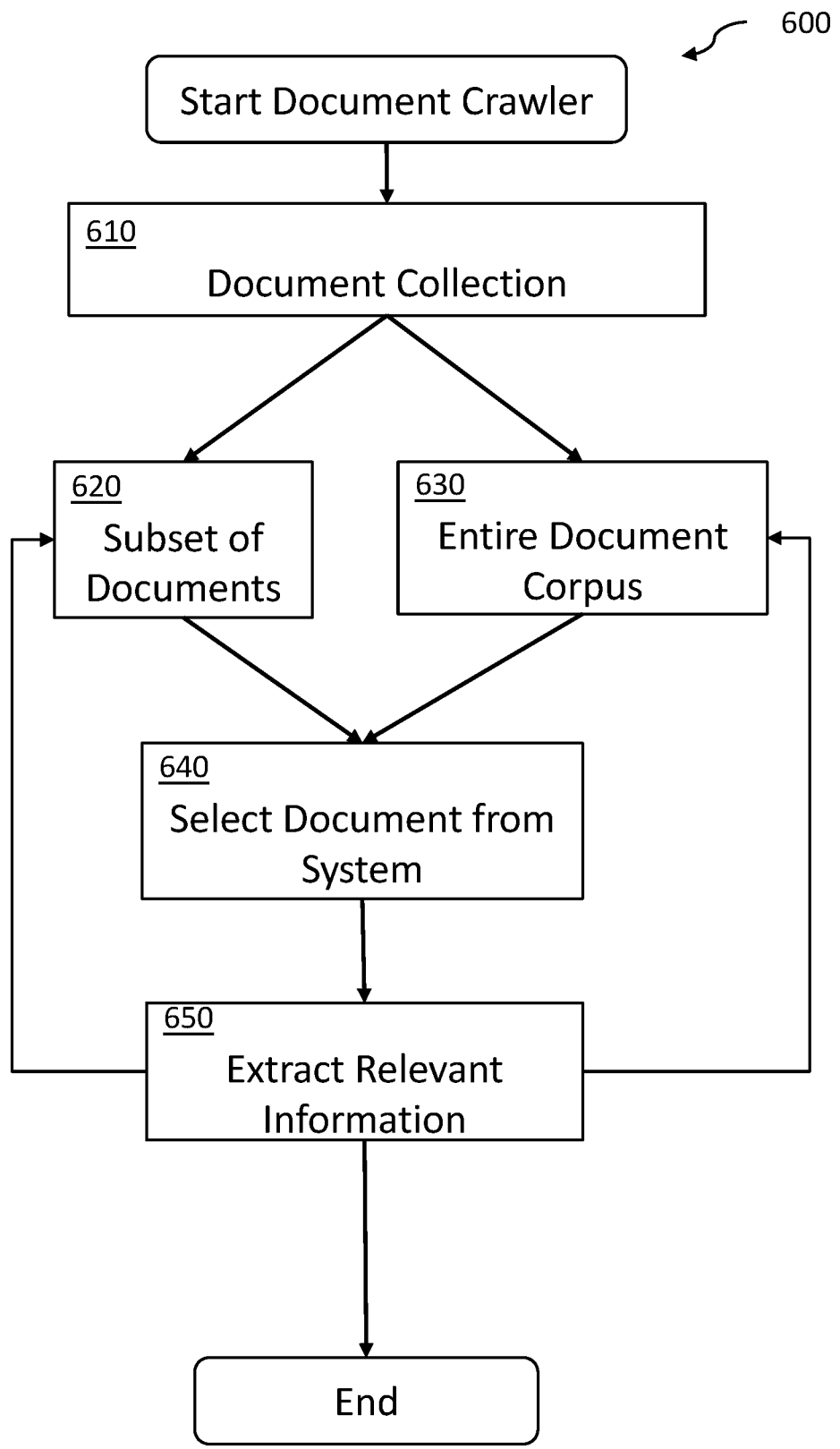
FIG. 6 is a flowchart of a selected portion of the method performed by the system of FIG. 1 according to an aspect of the present invention.

With reference to FIG. 6, a method according to one aspect of the present invention is shown, which may be referred to as the document crawler method 600. The document crawler method 600 may be used to have the system 100 extract information from documents 120 that is needed to construct a model 144 or more than one, which more than one model may be designated a first model 144a, a second model 144b, and so on for any number of models. The document crawler method 600 comprises the following steps: first, the document crawler module 510 initiates a review of a document collection 610. The document collection 610 may be a training dataset of a plurality of the documents 120 associated with a user 110, or may be a plurality of documents 120 associated with a plurality of users 110 who have a particular association with each other, e.g. the plurality of users 110 may work at the same company, or may have some other relationship with each other. Alternatively, the document collection 610 may comprise documents 120 of a particular type, e.g. a particular type of contract, wills, trust documents, minutes of board meetings, regulatory filings, or any other type of documents 120 which may be selected by a user 110 or a plurality of users 110 for purposes of the desired training. In some aspects of the document crawler method 600, a document 120n is deemed relevant if it has at least a minimum number of potential fields which may be recognized as one of the plurality of datatypes 132 or as one of the plurality of patterns 142; and/or a document 120n is deemed relevant if it has at least a minimum length.

Thereafter, the document crawler method 600 selects a subset 620 of documents 120, and/or selects the entire document corpus 630; the document corpus 630 being the set of documents 120 and/or one or more than one template document 190 as stored by the system 100, e.g. on the server device 114, or more than one server device 114, or in other storage media or storage locations. The document crawler method 600 then selects 640 a first document 120a from the plurality of documents 120 in the system 100, and then can extract 650 relevant information from the first document 120a from the documents 120. The relevant information comprises the plurality of datatypes 132, the plurality of patterns 142, the fields tagged by the user 110, and/or the first document 120a text metadata (including but not limited to highlighted text, bold text, and other formatting). The document crawler method 600 may return the entirety of the document text 122; or may return a subset of the document text 122; and/or may return an annotated or tagged set of information related to the first document 120a (or any document 120n), which set of information may be coded as any Extensible Markup Language (xml) or any other language, format, or data structure now known or later invented, and thereafter the document text 122 itself, and perhaps, as well as other meta data properties is extracted from the xml or other tagged set of information. The document crawler method 600 may iterate for any number of documents 120 (e.g., the first document 120a, the second document 120b, the third document 120c, through any document 120n), to extract 650 relevant information from each of the documents 120. The document crawler method

600 may be run as part of the self-learning method 500, or independently of the self-learning method 500.

Figure 7:
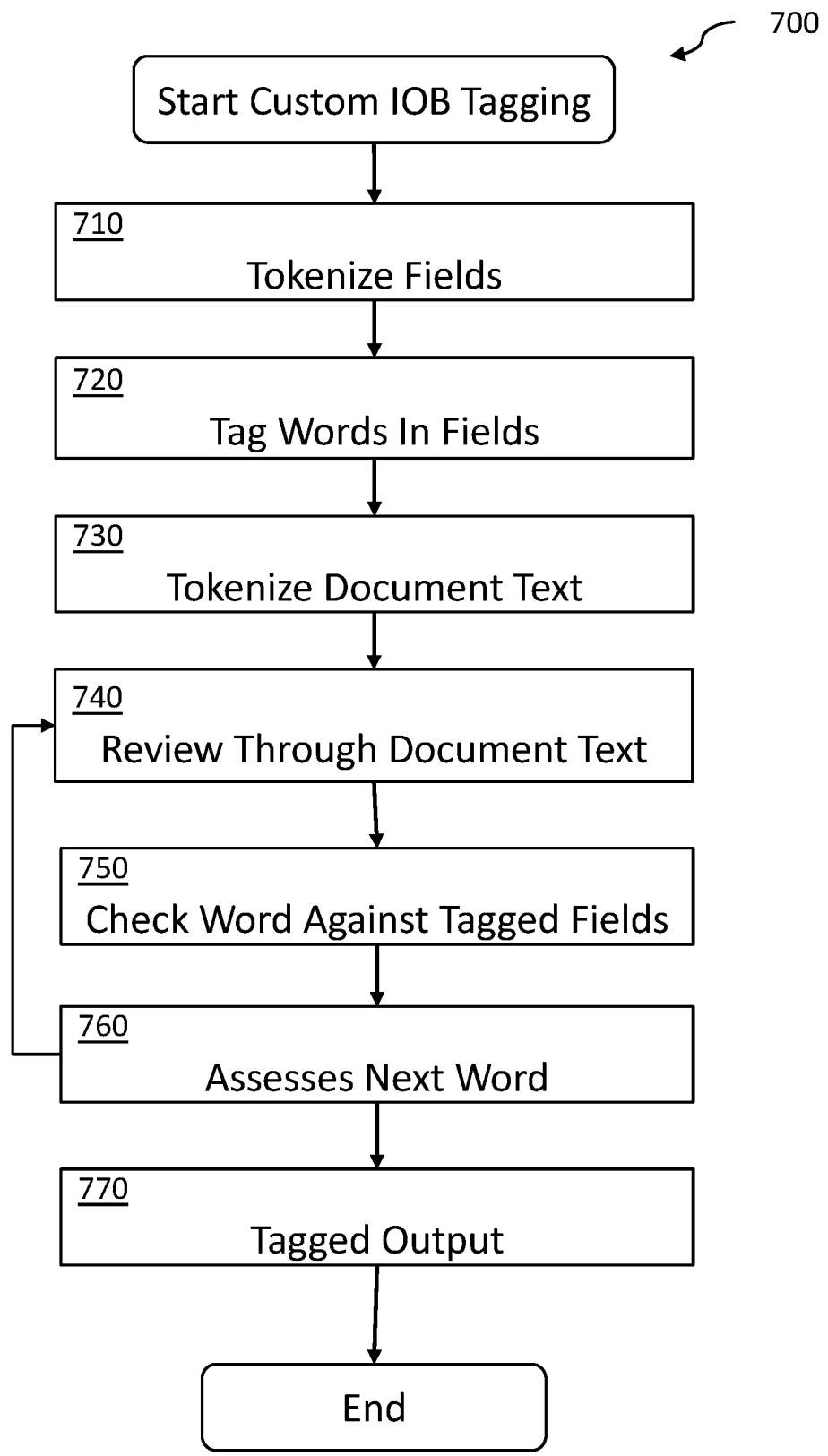
FIG. 7 is a flowchart of a selected portion of the method performed by the system of FIG. 1 according to an aspect of the present invention.

With reference to FIG. 7, a method according to one aspect of the present invention is shown, which may be referred to as the custom IOB tagging method 700. The custom IOB tagging method 700 may be used to prepare the information gathered in the document crawler method 600 for use in the model 144. First, the custom IOB tagging module 540 takes as input the training dataset 530, and the custom IOB tagging module 540 will tokenize 710 a set of fields, the set of fields being the tagged fields 180, by tagging 720 each word and punctuation mark in the tagged fields 180: the first word or punctuation mark is tagged "B" for "Beginning"; and each remaining word or punctuation mark is tagged "I" for "Inside". The text of the first document 120a is then tokenized 730 into a set of words and punctuation and parts of speech—this may be done, in some aspects of the custom IOB tagging method 700, for each word in a sentence, and/or for each sentence in a paragraph, for instance. The custom IOB tagging method 700 will then review 740 the text of the first document 120a that corresponds to the tokenized 730 set of words and punctuation and parts of speech. The custom IOB tagging method 700 then checks 750 each such word, punctuation, or part of speech against the tagged fields 180 which were tagged with "B"—if the word, punctuation, or part of speech appears in the tagged fields 180, the custom IOB tagging method 700 tags that word, punctuation, or part of speech with "B"; and if the word, punctuation, or part of speech does not appear in the tagged fields 180, the custom IOB tagging method 700 tags that word, punctuation, or part of speech with "O" (for "Outside" of the tagged fields 180). The custom IOB tagging method 700 then assesses 760 the next word, punctuation, or part of speech, and performs the same steps of review 740 of the text of the first document 120a, and then checks 750 each next word, punctuation, or part of speech against the tagged fields 180. These steps are repeated for each word, punctuation, or part of speech. The resulting tagged output 770 of the custom IOB tagging method 700 is a set of all of the words, punctuation, and/or parts of speech in the first document 120a, each with its IOB and part-of-speech tag. This custom IOB tagging method 700 may be repeated for each of the plurality of documents 120 from the document crawler method 600. The custom IOB tagging method 700 may be run as part of the self-learning method 500, or independently of the self-learning method 500.

Figure 8:
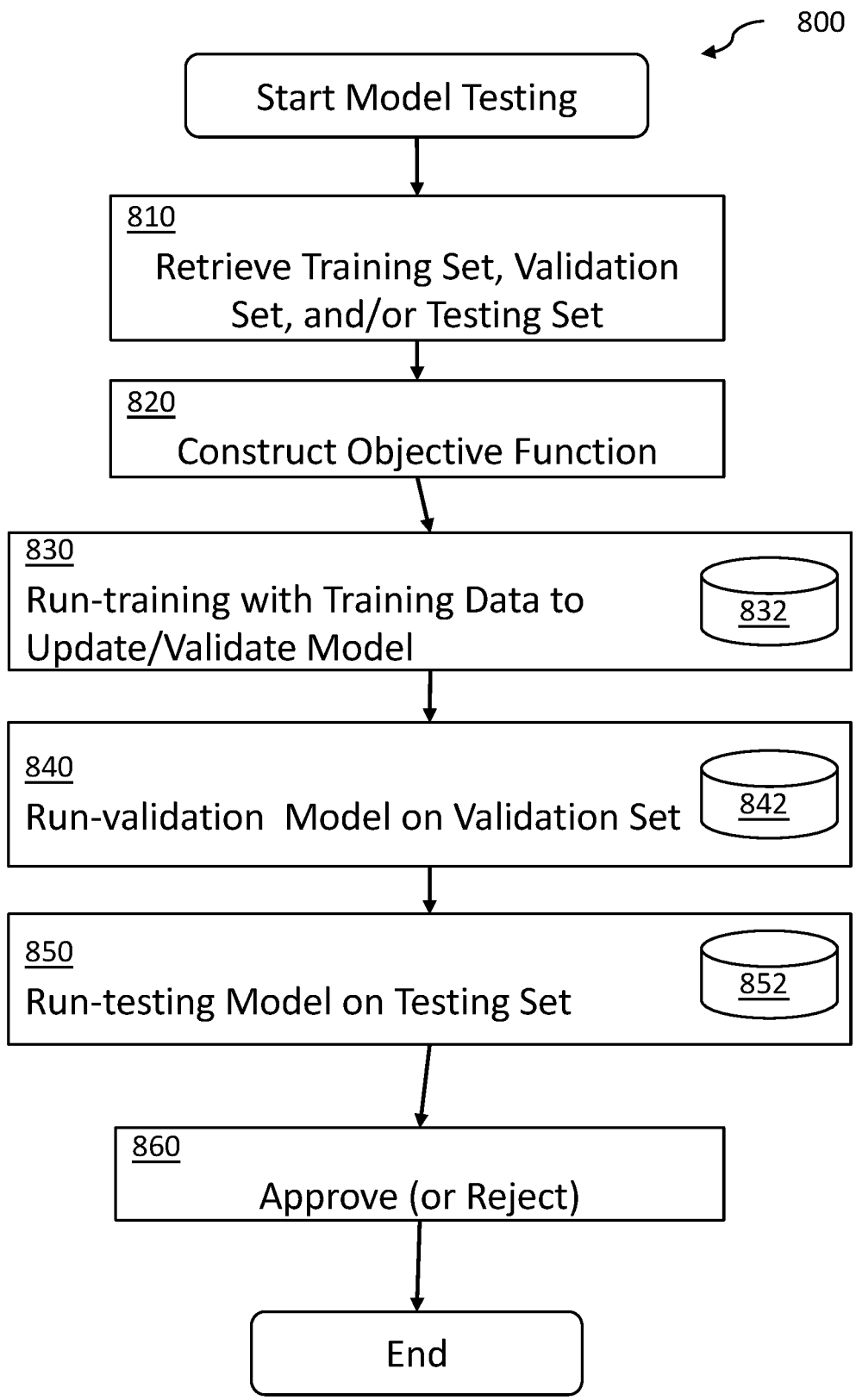
FIG. 8 is a flowchart of a selected portion of the method performed by the system of FIG. 1 according to an aspect of the present invention.

With reference to FIG. 8, a method according to one aspect of the present invention is shown, which may be referred to as the model testing method 800. The model testing method 800 may be used to measure the performance of the model 144 as constructed in the self-learning method 500, as described herein. First, the model testing method 800 does retrieve 810 one of the training dataset 530, the validation dataset 532, or the testing dataset 534. Next, the model testing method 800 will construct 820 an objective function, which objective function measures the performance of the model 144 in matching the document fields 520 and the document text/metadata 522 to the contents of the model 144. The objective function assesses the document fields 520 and the document text/metadata 522 to determine whether, for each element of the contents of the training dataset 530, the validation dataset 532, or the testing dataset 534 match, the element: A) Is an exact match of one of the tagged fields 180 that matches both the type of entity (word, punctuation, or part of speech) and the beginning ("B") and inside ("I") tags; or B) Is a match of the beginning ("B") and inside ("I") tags, regardless of the type of entity; or C) Is a partial match of the beginning ("B") and inside ("I") tags, regardless of the type of entity; or D) Simply means that anything matches. The model testing method 800 then calculates a weighted statistical score for the model 144 and the dataset used (the training dataset 530, the validation dataset 532, or the testing dataset 534). The statistical score may be a F1 score, or may be any other statistical method or score now known or later invented.

The model testing method 800 will thereafter run-training 830 the model 144 on the training dataset 530. If the output of the model 144 exceeds a training-threshold 832 based on the statistical score, the model testing method 800 will proceed. If the output of the model 144 is below the training-threshold 832 based on the statistical score, the model testing method 800 will pause, and may require adjustment of parameters comprising the statistical score creation until the output of the model 144 can meet the training-threshold 832.

Where the output of the model 144 exceeds the training-threshold 832 based on the statistical score, the model testing method 800 will thereafter run-validation 840 the model 144 on the validation dataset 532. If the output of the model 144 exceeds a validation-threshold 842 based on the statistical score, the model testing method 800 will proceed. If the output of the model 144 is below the validation-threshold 842, the model testing method 800 will pause, and may require adjustment of parameters comprising the statistical score creation until the output of the model 144 can meet the validation-threshold 842.

Where the output of the model 144 exceeds the validation-threshold 842 based on the statistical score, the model testing method 800 will thereafter run-testing 850 the model 144 on the testing dataset 534. If the output of the model 144 exceeds a testing-threshold 852 based on the statistical score, the model testing method 800 does approve 860 the model 144, which can be used in the shallow parsing module 130 and/or in the pattern recognition module 140.

If the output of the model 144 is below the testing-threshold 852, the model testing method 800 has failed, and the model testing method 800 does not approve 860 the model 144. The self-learning module 126 may re-start the self-learning method 500. It has been found advantageous to have each of the training-threshold 832, the validation-threshold 842, and the testing-threshold 852 be approximately equal to each other.

Figure 9:
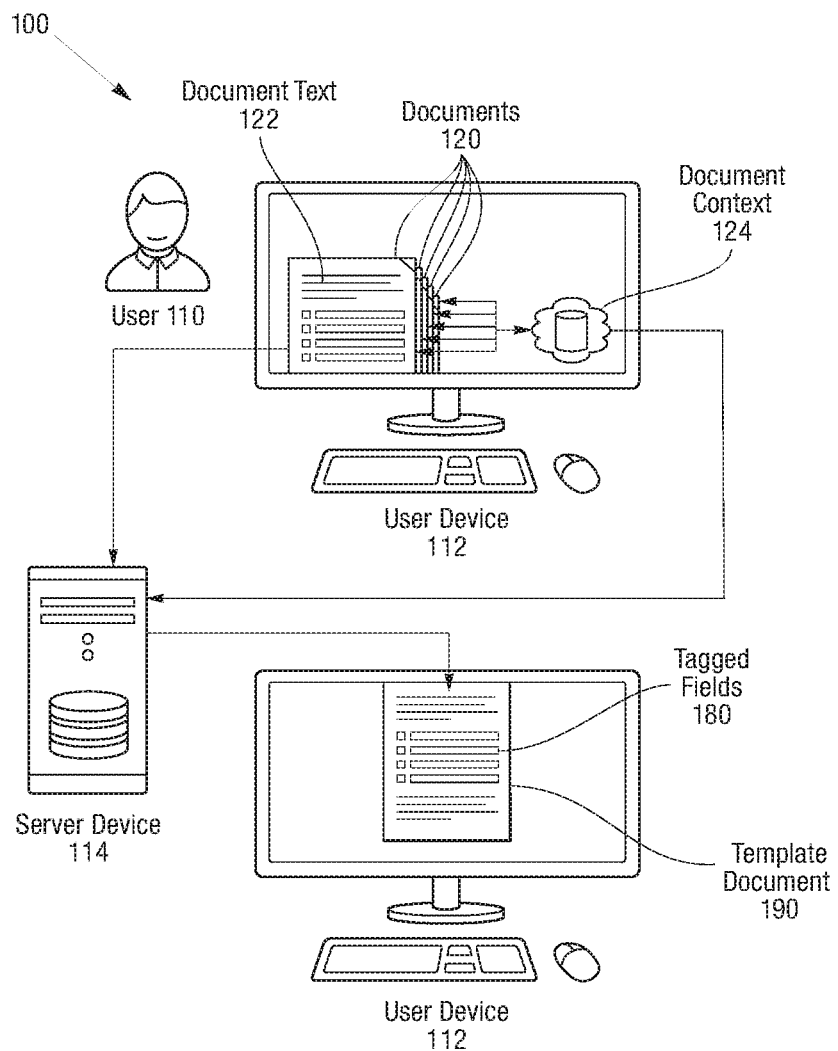
FIG. 9 illustrates a representative view of the system of the present invention.
Figure 10:
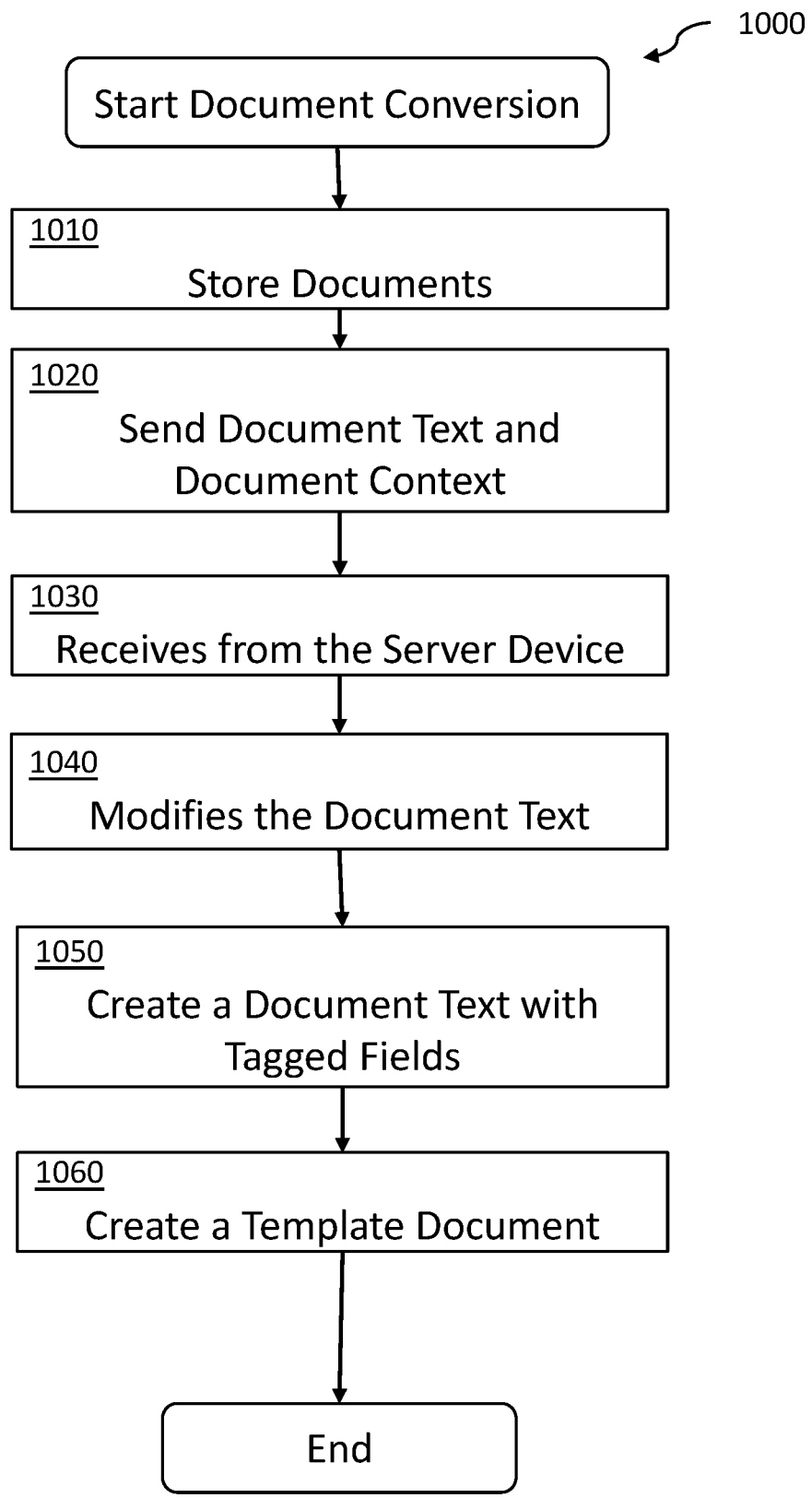
FIG. 10 is a flowchart of a selected portion of the method performed by the system of FIG. 1 according to an aspect of the present invention.
Figure 11:
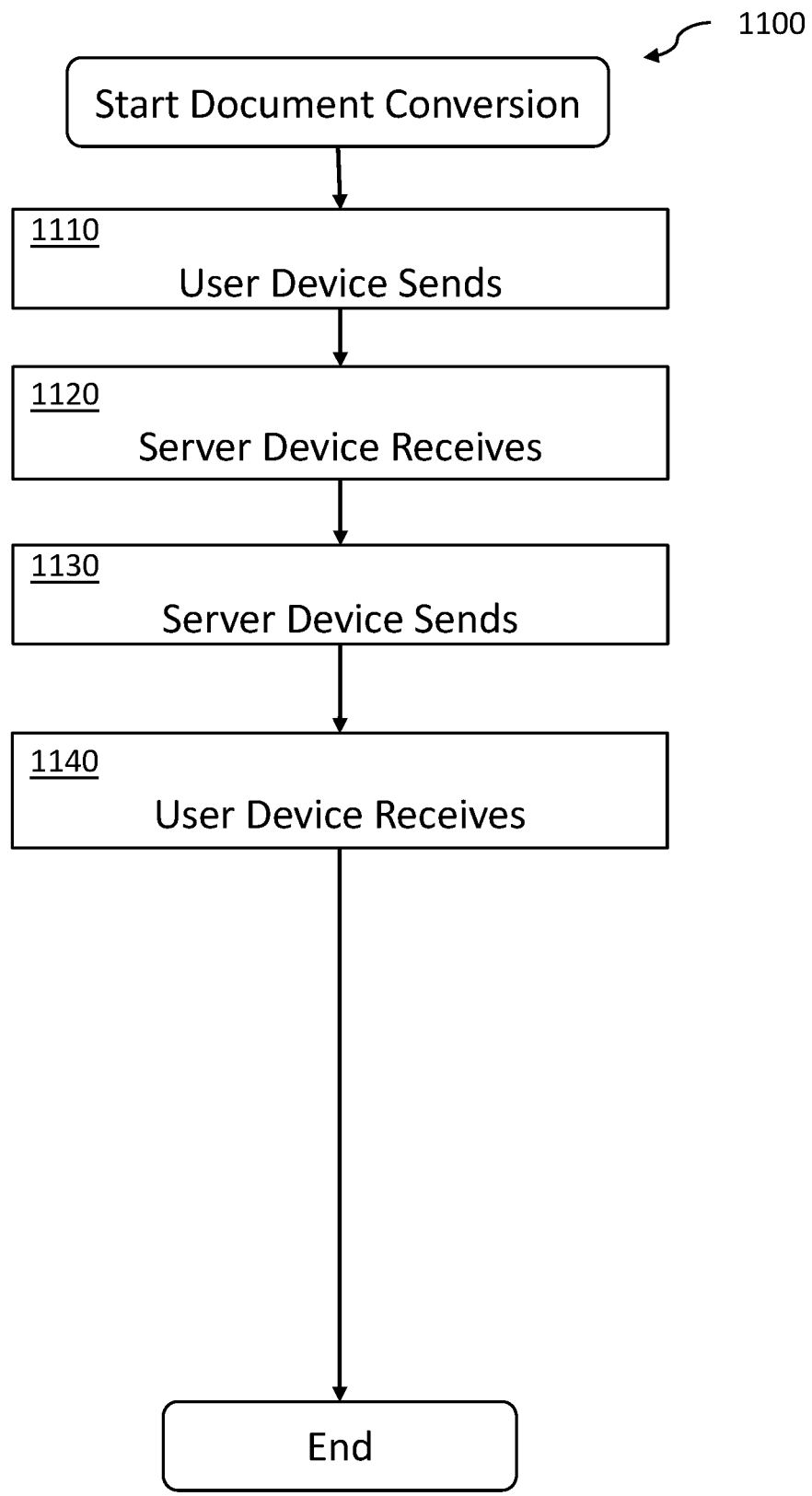
FIG. 11 is a flowchart of a selected portion of the method performed by the system of FIG. 1 according to an aspect of the present invention.

With regard to FIG. 9, an exemplary system 100 for template creation from document text is depicted. The system 100 comprises at least one user device 112, which may be used by a user 110. The user device 112 has stored on it a plurality of documents 120, which plurality of documents 120 comprise document text 122 and document context 124, and as disclosed here, any non-specified document may be referred to herein as a document 120n, and the first document 120a, the second document 120b, the third document 120c, and so on, are understood to be depicted in the plurality of documents 120 illustrated in FIG. 9. The system 100 comprises at least one server device 114, and the document text 122 and document context 124 may be communicated to the at least one server device 114. The at least one server device 114 may communicate to the user device 112 a plurality of template documents 190, each such template document 190 may have a plurality of tagged fields 180.

Figure 12:
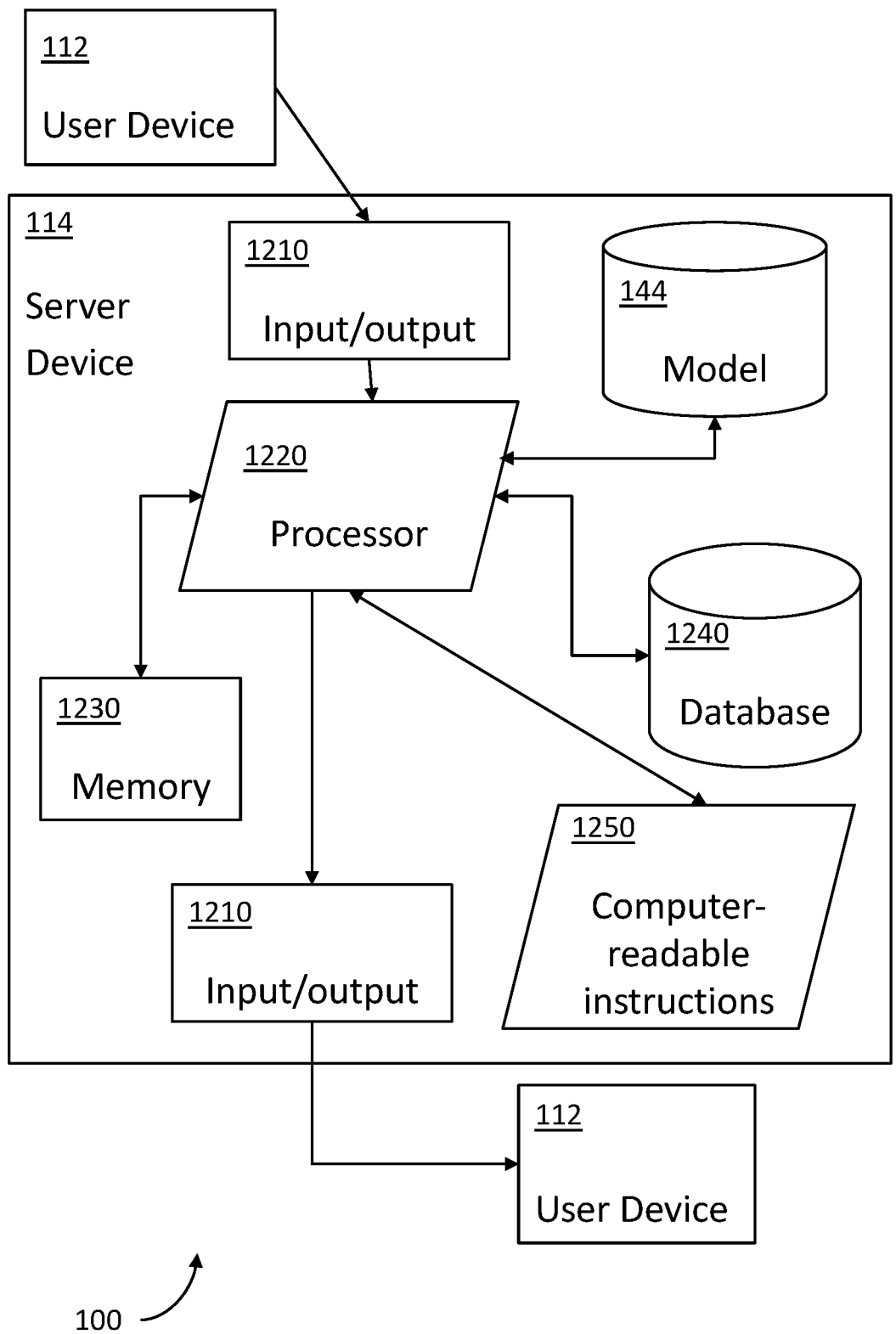
FIG. 12 depicts an exemplary system for carrying out the methods of the present invention according to an aspect of the present invention.

With reference to FIG. 12, an exemplary system 100 and server device 114 are depicted in operation and communication for carrying out the methods of the present disclosure. The system 100 comprises at least one user device 112 and at least one server device 114. The at least one server device 114 may comprise a plurality of input/output components 1210, a plurality of processors 1220, a plurality of memory components 1230, a plurality of databases 1240, and a plurality of computer-readable instructions 1250 stored in non-transitory computer-readable media configured to carry out the various elements of the inventive methods. The non-transitory computer readable media may include the plurality of memory components 1230, the plurality of databases 1240, or other computer readable media. The plurality of computer-readable instructions 1250 may include instructions for carrying out any of the methods described in the present disclosure.

The various modules and/or functions described above may be implemented by computer-executable instructions, such as program modules, executed by a conventional computer. Generally, program modules include routines, programs, objects, components, data structures, etc. that perform particular tasks or implement particular abstract data types. Those skilled in the art will appreciate that the invention may be practiced with various computer system configurations, including hand-held wireless devices such as mobile phones or PDAs, multiprocessor systems, microprocessor-based or programmable consumer electronics, mini-computers, mainframe computers, and the like. The invention may also be practiced in distributed computing environments where tasks are performed by remote processing devices that are linked through a communications network. In a distributed computing environment, program modules may be located in both local and remote computer-storage media including memory storage devices.

The central computing device, also referred to as a processor, may comprise or consist of a general-purpose computing device in the form of a computer including a processing unit, a system memory, and a system bus that couples various system components including the system memory to the processing unit. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by the processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, the iOS operating system, the Android operating system, the Chrome operating system, an OPENSTEP operating system or another operating system or platform.

Any suitable programming language may be used to implement without undue experimentation the data-gathering and analytical functions described above. Illustratively, the programming language used may include assembly language, Ada, APL, Basic, C, C++, C*, COBOL, dBase, Forth, FORTRAN, Java, Modula-2, Pascal, Prolog, Python, Qt, REXX, and/or JavaScript for example. Further, it is not necessary that a single type of instruction or programming language be utilized in conjunction with the operation of the system and method of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

The network over which communication takes place may include a wired or wireless local area network (LAN) and a wide area network (WAN), wireless personal area network (PAN) and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Certain embodiments of the present invention were described above. From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. It is expressly noted that the present invention is not limited to those embodiments described above, but rather the intention is that additions and modifications to what was expressly described herein are also included within the scope of the invention. Moreover, it is to be understood that the features of the various embodiments described herein are not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. A system for template creation from document text, the system comprising:
    at least one user device, which has stored on it a plurality of documents, which plurality of documents comprise document text and document context;
    at least one server device, which comprises a plurality of input/output components, a plurality of processors, a plurality of memory components, a plurality of databases, and a plurality of computer-readable instructions stored in non-transitory computer-readable media; and
    wherein the server device has stored on it information about a plurality of datatypes and a plurality of patterns, which together comprise a model; and
    wherein the server device employs a shallow parsing module, a pattern recognition module, and a verification module.

2. A document conversion method for template creation from document text, the method comprising:
    a server device receives a document text from a user device,
    the server device identifies a context of the document text,
    the server device conducts shallow parsing, wherein shallow parsing comprises:
        the server device identifies a plurality of datatypes relevant to the document text and the document context, then
        the server device searches the document text for one of a plurality of datatypes, then
        the server device finds an instance of each one of the plurality of datatypes in the document text, then
        the server device parses the text around the instance of each one of the plurality of datatypes for a text-instance, then
        the server device adds the text-instance to a list of text-instances, then
        the server device assesses whether all the document text has been searched; and
    the server device conducts pattern recognition, wherein pattern recognition comprises:
        the server device identifies a plurality of patterns relevant to the document text and the document context, then
        the server device searches the document text for one of the plurality of patterns, then
        the server device finds a pattern-instance of that one of the plurality of patterns in the document text, then
        the server device adds the pattern-instance to a list of pattern-instances, then
        the server device assesses whether all the document text has been searched for that one of the plurality of patterns; and
    the server device assembles a list of all datatype text-instances and pattern-instances identified in the document text,
    the server device sends the list of all datatype text-instances and pattern-instances identified to the user device, whereupon
    the user device replaces the identified datatype text-instances and pattern-instances in the document text with a set of tagged fields, and
    the user device creates a new template document with the set of tagged fields.

3. The method of claim 2, wherein the method further comprises the server device determines that all the document text has not been searched for the one of the plurality of datatypes, and thereafter the server device continues searching the document text for the one of the plurality of datatypes.

4. The method of claim 2, wherein the method further comprises the server device determines that all the document text has been searched for the one of the plurality of datatypes, and thereafter the server device verifies each text-instance with datatype verification criteria for that one of the plurality of datatypes, saves each verified text-instance to a list of verified shallow parsing datatype text-instances, and checks for another one of the plurality of datatypes to search.

5. The method of claim 4, wherein the method further comprises the server device determining that there is another one of the plurality of datatypes to search, the server device thereafter iterates prior steps of the shallow parsing method to search for a next one of the plurality of datatypes.

6. The method of claim 4, wherein the method further comprises the server device determining that there is not another one of the plurality of datatypes to search, then the server device stops the shallow parsing method.

7. The method of claim 2, wherein the method further comprises the server device determines that all the document text has not been searched for that one of the plurality of patterns, and thereafter the server device continues searching the document text for that one of the plurality of patterns.

8. The method of claim 2, wherein the method further comprises the server device determines that all the document text has been searched for that one of the plurality of patterns, and thereafter the server device verifies each pattern-instance with verification criteria for that one of the plurality of patterns, saves each verified pattern-instance to a list of verified pattern-instances, and checks for another one of the plurality of patterns to search.

9. The method of claim 8, wherein, if each applicable one of the plurality of patterns has not been searched for, the method further comprises the server device determining that there is another one of the plurality of patterns to search, and the server device thereafter iterates prior steps of the pattern recognition method to search for a next one of the plurality of patterns.

10. The method of claim 8, wherein, if each applicable one of the plurality of patterns has been searched for, the method further comprises the server device determining that there is not another one of the plurality of patterns to search, and the server device stops the pattern recognition method.

11. The method of claim 2, wherein the user device stores a plurality of documents, and sends the document text and the set of document context to the server device; thereafter the user device receives from the server device a plurality of verified datatype text-instances and a plurality of verified pattern instances; thereafter the user device modifies the document text with the plurality of verified datatype text-instances and the plurality of verified pattern instances to create the document text with the set of tagged fields; thereafter the user device uses the document text with the set of tagged fields to create a template document.

12. A plurality of computer-readable instructions stored in non-transitory computer-readable media configured to carry out methods for template creation from a document text, as described in claim 2.

\* \* \* \* \*